United States Patent [19]
Pennebaker

[11] Patent Number: 5,157,488
[45] Date of Patent: Oct. 20, 1992

[54] ADAPTIVE QUANTIZATION WITHIN THE JPEG SEQUENTIAL MODE

[75] Inventor: William B. Pennebaker, Carmel, N.Y.

[73] Assignee: International Business Machines Corporation, Armonk, N.Y.

[21] Appl. No.: 702,904

[22] Filed: May 17, 1991

[51] Int. Cl.$^5$ .............................................. H04N 7/13
[52] U.S. Cl. ...................................... 358/133; 358/13; 358/136
[58] Field of Search ................. 358/13, 133, 135, 136; 341/200

[56] References Cited

U.S. PATENT DOCUMENTS

| | | |
|---|---|---|
| 4,386,366 | 5/1983 | Mori . |
| 4,467,346 | 8/1984 | Mori . |
| 4,580,162 | 4/1986 | Mori . |
| 4,584,597 | 4/1986 | Guichard . |
| 4,639,778 | 1/1987 | Yamaguchi et al. . |
| 4,656,500 | 4/1987 | Mori . |
| 4,698,689 | 10/1987 | Tzou . |
| 4,716,453 | 12/1987 | Pawelski .............................. 358/13 |
| 4,791,483 | 12/1988 | Miller ............................... 358/13 X |
| 4,831,636 | 5/1989 | Taniguchi et al. . |
| 4,860,313 | 8/1989 | Shpiro .............................. 358/136 X |
| 4,992,273 | 5/1990 | Yonekawa et al. . |
| 5,008,747 | 4/1991 | Carr et al. ........................... 358/136 |
| 5,021,879 | 6/1991 | Vogel .............................. 358/136 X |

OTHER PUBLICATIONS

"The JPEG Technical Specification" Rev. 8, Aug. 14, 1990, Computer and Business Equipment Manufacturers Association, 311 1st Street, N.W., Suite 500, Washington, D.C. 20001-2178.

*Primary Examiner*—Victor R. Kostak
*Attorney, Agent, or Firm*—Sterne, Kessler, Goldstein & Fox

[57] ABSTRACT

A system and method for masking adaptive quantization during compressed image data transmission by defining a scaling factor for the quantization tables of the multiple image components, wherein the scaling factor signals changes in quantization for successive blocks of the image data. The scaling factor is transmitted as a further component together with the image components to thereby signal adaptive quantization of the image data.

17 Claims, 3 Drawing Sheets

ADAPTIVE QUANTIZATION WITHIN THE JPEG SEQUENTIAL MODE

TECHNICAL FIELD

The present invention is directed to adaptive quantization which allows better tailoring of the quantization used in image compression schemes to the visual properties of the human eye. More specifically, the present invention is directed to a method for masking adaptive quantization as a separate component for transmission together with the image components in a system for transmitting multiple components of an image.

BACKGROUND ART

The current definition of the JPEG (Joint Photographic Experts Group) standard does not allow for any form of adaptive quantization. Adaptive quantization can significantly improve the image quality achieved at a given bit rate.

Adaptive quantization is not new. For example, one scheme for adaptive quantization is disclosed in U.S. Pat. No. 4,922,273 to Yonekawa. Yonekawa teaches a technique for automatically adjusting quantization based on activity measures derived from the Discrete Cosine Transform (DCT) coefficients. In addition, in an MPEG scheme (Moving Picture Experts Group, ISO-IEC/JTC1/SC2/WG11), the DC coefficient is fixed while a single scaling factor is used to adjust the quantization levels for all 64 coefficients produced by the 8×8 DCT. Another possible method for adapting the quantization is to individually change the value of each of the 64 quantization values.

There exist alternative methods to achieve adapting of the quantization within the JPEG standard. However, none of these alternatives can be used in a simple sequential mode, as all require full DCT or image buffering in some form. One possible alternative for transmitting adaptive quantization information is the use of one of the JPEG Application Marker Segments. The disadvantages of this alternative are that these Marker Segments are currently undefined and individual implementers are not permitted to define them. The adaptive quantization always has to be transmitted separately from the actual coded image data, which would not be appropriate when using Marker Segments. Finally, Marker Segment require a non-standard algorithm for the coding of the quantization values.

A simple form of adaptive quantization can be achieved with the JPEG successive approximation progressive mode. Basically, at some point in the encoding process, the coefficients in regions which need only coarse quantization are not improved as further successive approximation scans are coded. Effectively, the quantization is coarser by a power of 2 in those regions if a successive approximation progressive mode technique is used. The disadvantages of this approach are the need for a full progressive implementation, the relatively coarse scaling of quantization values, the development of a "fat zero" for very coarse quantization.

A similar form of adaptive quantization can be realized within the JPEG sequential mode. In the encoder, low magnitude bits are cleared in regions where coarser quantization is desired. This has the same effect as not updating some regions in the progressive mode, therefore, except for operating sequentially, suffers from the same objections detailed above.

Still another alternative form for adaptive quantization could use the JPEG hierarchical mode. In this case, refinement of the quantization would require a second frame in which selective parts of the image are improved.

DISCLOSURE OF INVENTION

The system and method of the present invention (the present invention) allow adaptation of the quantization used in the JPEG image compression system in a manner which is consistent with the standard sequential mode JPEG compressed data syntax. The present invention has utility to anyone interested in implementing JPEG, because adaptive quantization usually produces significant improvement in image compression. The present invention involves a method for masking adaptive quantization as a separate component for transmission together with the image components in a system for transmitting multiple components of an image. The system thereby permits signaling of changes in quantization values from one block of data to the next during compressed image data transmission. Using scaled DCT calculations, the quantization table can be fed into a separate component of image data. In the JPEG standard, for instance, the fourth unspecified component of the interleave can be used to signal adaptive quantization for enhanced data compression.

The foregoing and other objects, features and advantages of the invention will be apparent from the following more particular description of preferred embodiments of the invention, as illustrated in the accompanying drawings.

BRIEF DESCRIPTION OF DRAWINGS

The invention will be better understood if reference is made to the accompanying drawings in which.

BEST MODE FOR CARRYING OUT THE INVENTION

The following is an overview of the "Joint Photographic Experts Group" (JPEG) standard. JPEG is a joint committee under the auspices of both ISO IEC JTC1/SC2/WG10 (Coded Representation of Picture and Audio Information) and CCITT/SGVII/CCIC (Common Components for Image Communication) for the purpose of standardizing color image compression techniques.

The JPEG "Tool Kit"

The JPEG architecture can be viewed as a "tool kit" of compression capabilities from which various applications can define a compression system which is suitable for their particular needs. The JPEG tool kit includes both lossy and lossless coding techniques, as well as several modes of sequential and progressive coding of the image data. The structure of the JPEG tool kit will be explained and related to an underlying set of coding schemes which have been used to construct the JPEG tool kit.

The JPEG architecture can be split into two basic categories, hierarchical and non-hierarchical. The non-hierarchical modes will be described first, as the hierarchical mode can be defined in terms of extensions of the non-hierarchical modes.

Non-Hierarchical Modes for Lossy Coding

Figure 1A:
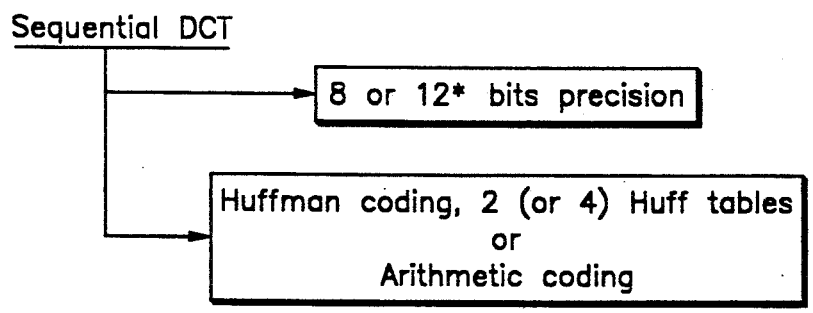
FIGS. 1A-1C show the structure of the non-hierarchical JPEG Tool Kit.
Figure 1B:
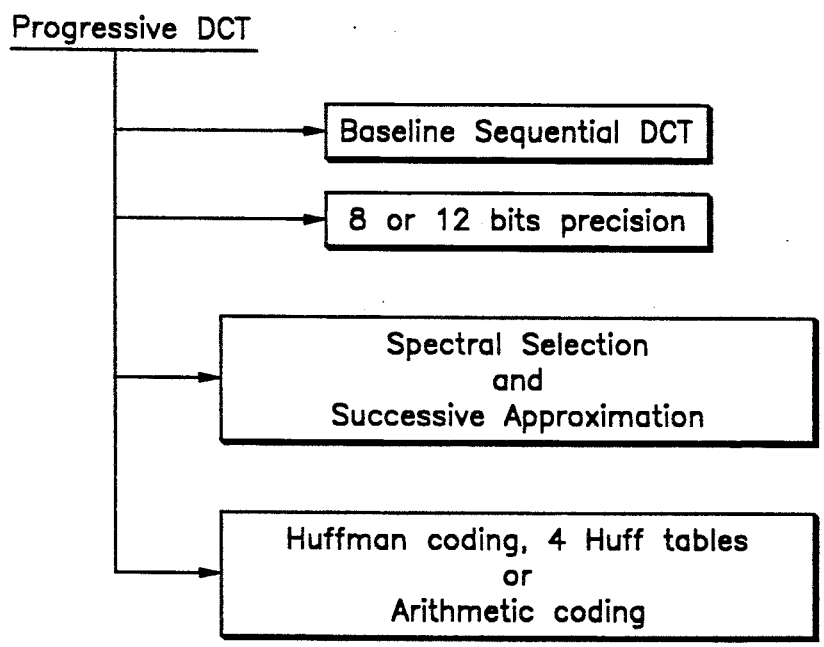
Figure 1C:
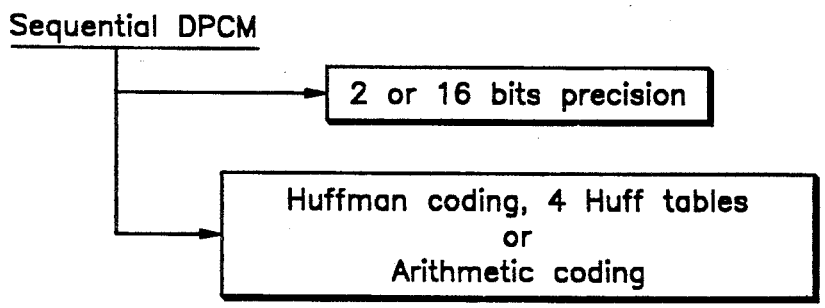

Referring to FIGS. 1A-1C, the non-hierarchical modes for lossy coding are based on a family of techniques which use a quantized 8×8 Discrete Cosine Transform (DCT). This family of lossy DCT coding techniques can be divided into two basic coding modalities, namely sequential coding and progressive coding.

Sequential Coding of the DCT

In sequential coding an image component is coded completely in one scan through the data, as shown in FIG. 1A. In this sequential coder (and in all other non-hierarchical DCT coding modes) the loss (i.e., the distortion introduced by the coding process), is determined almost entirely by the quantization values used to quantize the 8×8 DCT. A separate scalar quantizer is specified for each of the 64 DCT coefficients, thereby allowing the quantization to be closely matched to the properties of the human visual system. The coding of the quantized DCT coefficient values is lossless.

The lowest level of capability for the sequential DCT is the "baseline system". This system is intended to allow a very simple implementation in hardware. It is therefore restricted to sequential mode, Huffman coding, only two Huffman code tables, and a precision of 8 bits for each sample. The JPEG Technical Specification (JPEG8-R8) contains the mandate that all DCT coding implementations must provide this baseline capability in addition to any "extended" capabilities which might be needed to meet the specific requirements of the application.

The JPEG Draft Technical Specification is publicly available. In the United States copies of the JPEG draft technical specification are available to persons having an interest in participating in this review from Accredited Standards Committee X3 (Information Systems). Requests for copies of the document should be submitted in writing to: X3 Secretariat, Computer and Business Equipment Manufacturers Association, 311 First Street, NW, Suite 500, Washington, D.C. 20001-2178 (Attention: JPEG DRAFT SPECIFICATION). (See, "Revision 8 of the JPEG Technical Specification", Aug. 14, 1990, for background on the current JPEG standard. The JPEG Technical Specification is non-essential background information and is incorporated herein by reference in its entirety as if duplicated below in full.)

A number of extensions can be added to the baseline sequential DCT capability. These include two more Huffman tables, an alternative one-pass entropy coding technique known as arithmetic coding, and input precisions of either 8 or 12 bits per sample.

The coding model for the DCT is as follows. The 8×8 array of DCT coefficients are ordered into a one-dimensional vector using the well known zigzag scan sequence shown in Table 1. The coefficient labelled zero is the "DC" coefficient, increasing horizontal "AC frequencies" are from left to right and increasing vertical "AC frequencies" are from top to bottom.

TABLE 1

| Zigzag scan index sequence for DCT coefficients | | | | | | | |
| --- | --- | --- | --- | --- | --- | --- | --- |
| 0  | 1  | 5  | 6  | 14 | 15 | 27 | 28 |
| 2  | 4  | 7  | 13 | 15 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 35 | 36 | 48 | 49 | 57 | 58 | 62 | 63 |

The coding of the DC coefficients is done with a one-dimensional DPCM (Differential Pulse Code Modulation) technique which uses the DC coefficient of the previous DCT block coded for the component as the prediction for the DC coefficient in the current block. Both Huffman and arithmetic coding code the difference value by classifying it according to a quasi-logarithmic scale (base 2), and then coding additional bits to exactly identify the difference value.

When Huffman coding is used, the AC coefficients in the zigzag scan are segmented into runs of zero coefficients terminated by nonzero coefficients. The nonzero coefficients which terminate each run are in turn separated into logarithmically increasing magnitude categories. Huffman codes are then assigned to each possible combination of zero run lengths and amplitude categories for the next nonzero coefficient. A separate code word is assigned to an "end-of-block" condition; this code word is sent after the last nonzero coefficient in the block (unless that coefficient is at position 63). Whenever a nonzero JPEG is coded, additional bits are appended to the code word to identify the precise magnitude. To limit the size of the Huffman table, a special code is assigned to runs of 16 zeros. Runs of zero coefficients longer than 15 must use this special code. The remainder is then coded with the appropriate run-length/amplitude category code. Binary arithmetic coding may be used in place of Huffman coding. In that case the coding of the AC coefficients in the zigzag scan is as follows. At the start of each 8×8 block and after each nonzero coefficient (except at position 63), a binary decision is coded identifying whether or not the end-of-block occurs at that position. Runs of zeros are coded by a sequence of binary decisions which identify whether each coefficient in the run is zero or not. Nonzero coefficients are coded by a binary decision sequence which identifies the logarithm (base 2) of the magnitude and the precise magnitude in a manner which is very similar to the Huffman coding structure.

Progressive Coding of the DCT

In progressive coding of the DCT the image is coded in multiple scans, as shown in FIG. 1B. The first scan provides an approximate representation of the image at a quality level which is defined by the coding parameters chosen. Subsequent scans improve the quality until the final desired representation is achieved. For a given quantization the final image is identical to that produced by sequential DCT coding.

Figure 2:
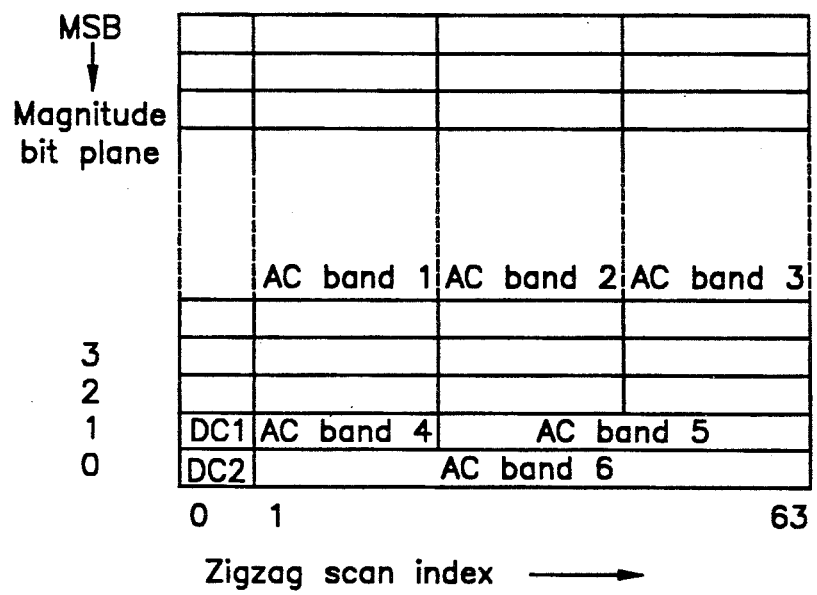
FIG. 2 shows an example of segmentation of the DCT for progressive coding.

Two different and complementary progressive modes for coding of DCT coefficients, "spectral selection" and "successive approximation," are listed in FIG. 1B. Spectral selection segments the DCT coefficients into "frequency" bands for each stage of the progression, and successive approximation improves the precision of the coefficients with each stage. Each stage in a successive approximation sequence is comprised of a set of spectral selection stages in which DC and AC coefficients are coded in separate stages and the AC coefficients may be further segmented into spectral selection bands which are coded in separate stages. When coding the AC coefficients, only one component may be coded in a scan. An example of the segmentation of a DCT block of maximum precision P into a progressive sequence is illustrated in FIG. 2.

The first successive approximation stage uses extended versions of the sequential coding algorithm to code reduced precision coefficients. The extensions permit coding of bands rather than the full set of AC coefficients and the Huffman code table is extended to include codes for EOB runs (where EOB now means end-of-band rather than end-of-block). This latter extension is needed because of the increased probability of low activity DCT blocks when the coefficient precision is reduced.

Subsequent successive approximation stages improve the precision of the coefficient magnitudes one bit plane at a time. Again, the Huffman and arithmetic coding models are similar in structure. The coefficients are separated into two classes, those which were nonzero at the completion of the previous successive approximation stage and those which were zero. In Huffman coding, a zero run length and EOB run structure is used to code the coefficients which were zero. In arithmetic coding a binary decision conditioned on the zigzag scan index is coded for the coefficients which were zero. In both codes the model is very similar to the scheme used in the first successive approximation stage. For the coefficients which were nonzero, both coders code one bit to improve the precision of the coefficient.

Non-hierarchical Sequential Mode for Lossless Coding

Since different implementations of DCTs usually produce slightly different numerical results, truly lossless coding is not possible when using the DCT modes, even in combination with the hierarchical mode discussed below. Therefore, as shown in FIG. 1C, a totally separate DPCM method is defined for sequential lossless coding.

The DPCM method used for lossless coding is a generalization of the DPCM method defined for coding of the DC coefficients of the DCT. The one-dimensional predictor is replaced by the selection of one of 7 predictors as shown in Table 2 below. In Table 2, Y is the sample being predicted, and A, B and C are the three nearest neighbor samples used for the prediction.

TABLE 2

Predictors for lossless coding

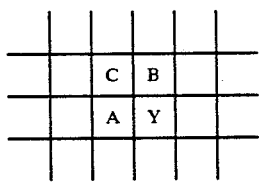

| Selection value | Prediction of Y |
|---|---|
| 0 | none (differential coding) |
| 1 | A |
| 2 | B |
| 3 | C |
| 4 | A + B − C |
| 5 | A + (B − C)/2 |
| 6 | B + (A − C)/2 |
| 7 | (A + B)/2 |

The encoder and decoder are defined for input precisions from 2 to 16 bits, and differences are calculated modulo 65536 to limit the difference precision to 16 bits. The Huffman coding and arithmetic coding of the differences are therefore extended to higher precision and the arithmetic coder is also extended to two-dimensional statistical conditioning. The point transform defined for the input and output paths of the first stage of successive approximation is retained in the lossless DPCM coding system. As in successive approximation, it is limited to a division by a power of two.

Hierarchical Mode

Figure 3:
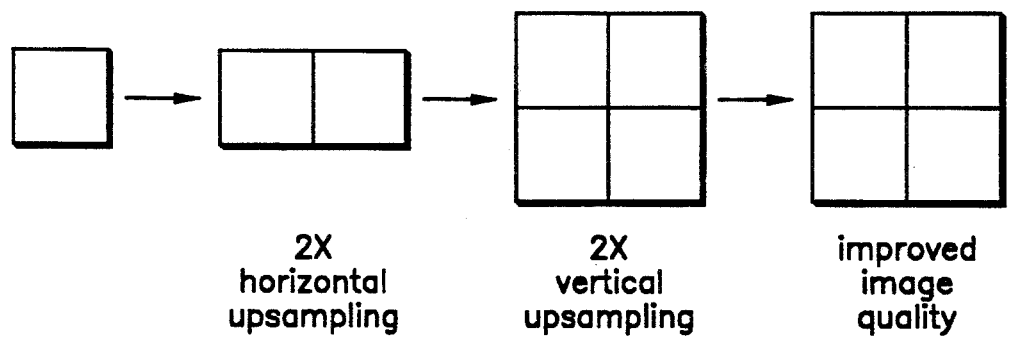
FIG. 3 shows an example of a hierarchical progression.

In addition to the non-hierarchical modes listed in FIGS. 1A–1C, a hierarchical progressive mode is defined. This hierarchical mode may be used in conjunction with upsampling filters (defined by JPEG) and downsampling filters (not defined by JPEG) to achieve a sequence of spatial resolutions. As illustrated in FIG. 3, the upsampling may be either by 2X horizontally or 2X vertically (2X both horizontally and vertically is also allowed), and the hierarchical mode may also be used without upsampling to improve image quality at the final spatial resolution. Any of the sequential or progressive modes shown in FIG. 1 may be used for the first stage of the hierarchical progression for a given component.

Subsequent hierarchical stages code the difference between the output of the previous stage (possibly upsampled) and the source image (possibly downsampled). For this hierarchical mode a differential version of the DCT has been defined which applies to any of the DCT modes. Alternatively, if a simple spatial PCM correction is desired, the differential coding technique required for DPCM coding can be applied to coding of the hierarchical mode difference. For spatial PCM correction the input point transform is defined for the hierarchical difference input, thereby providing a mechanism for bounding the maximum difference allowed (as opposed to full PCM correction). Restrictions are defined limiting the mixing of DCT and spatial stages. Any hierarchical progression which uses DCT modes may only use a single final differential spatial stage.

Data Interleaving

Although a given image can have up to 255 separate components, hierarchical progressions, progressive DCT scans and sequential scans with more than one component are limited to a maximum of four components. When more than one component is coded in a scan, the component data are interleaved in a pattern which is consistent with the relative sampling of the different components. In the sequential DCT mode 8×8 blocks of samples from each component are interleaved. When the DPCM mode is used individual component samples are interleaved.

Interleaving of data in a scan applies primarily to sequential coding. When the progressive DCT modes are used, only the DC coefficient coding may be interleaved.

The JPEG architecture consists of two basic coding models, one for coding of the DCT and the other for DPCM, and two entropy coders which are used with those models. The lossless and lossy compression techniques and the various sequential and progressive modes are constructed from different variations of this underlying set of models and coders.

With sequential, progressive, lossless and hierarchical modes defined, two different input precisions for the DCT modes and two different entropy coders, many different implementations are possible, as will become evident to those skilled in the art.

Many of the variations can be readily defended on the basis of function. For example, neither spectral selection nor successive approximation modes of progression work well separately. Together, however, they provide a very superior progression. The two entropy coders are allowed because JPEG found a basic need for both adaptive coding performance and simplicity. For DCT coding the single pass adaptive arithmetic coding typically achieves 8% to 14% better compression. However, Huffman coding is typically less complex.

The system and method the present invention provide for incorporating an adaptive quantization procedure within the standard JPEG compressed data syntax for sequential DCT coding discussed above.

The JPEG standard for lossy compression is based on a quantized 8×8 DCT, where individual quantizing values are used for each of the 64 coefficients of the DCT. The table of quantizing values is fixed for a given image component during the compression of the image.

Several different modes of operation have been defined by JPEG as discussed above. The first is a sequential DCT mode. The sequential DCT mode codes the DCT data for a given component in a single pass. The second is a progressive DCT mode. The progressive DCT mode codes the DCT data for a given component in multiple passes, refining the image quality with each pass. The third is a hierarchical mode. The hierarchical mode also codes the image in multiple passes. The hierarchical mode, however, usually codes in a pyramidal sequence which involves spatial resolution changes. The sequential DCT mode is the simplest, in that minimum buffering is required.

It is important to note that JPEG is only concerned with the encoding and decoding of image data. The interpretation of the data is beyond the scope of JPEG and is left to the applications which use JPEG. Given that the interpretation is still to be defined, there is a possibility of introducing adaptive quantization in a way which leaves the syntax of the compressed data stream and the structure of the coding models intact.

The implementation according to the present invention permits general scaling of the entire array of 64 coefficients, as well as the scaling of individual elements in the array. Further, the present invention also permits either the scaling of all tables by common scaling factors or separate scaling of individual tables with individual scaling factors.

A standard sequential JPEG decoder would be adapted to decode the compressed data generated using the present invention and may obtain a recognizable output. However, to fully interpret the data stream, the adaptive quantization would have to be imbedded into the decoding operation; in this respect the decoder would have capabilities beyond those required for the JPEG standard. Of course, the same requirement applies to any alternative way of achieving adaptive quantization which require scaling of the quantization tables.

The trivial case where the same scaling is used for all quantization tables (up to 4 tables can be used) will first be discussed.

JPEG defines a scan as a single pass through all data for a component or group of components. In sequential mode, an image component is coded in one scan. When more than one component is coded in a scan the data are interleaved by grouping the data into "Minimum Coding Units" (MCU). Each MCU contains samples from each component in proportion to the sampling factors defined for the data.

Effectively, the MCU is a "unit cell" of data, the smallest unit which may be coded when data are interleaved in a scan. Suppose, for example, that a three component color image is being, where the three components are Y, Cr, and Cb (a luminance-chrominance representation, as commonly known to those working in the field of image processing). For instance, if the vertical sampling factors are unity and the horizontal sampling factors of Y, Cr and Cb are 2, 1, and 1, respectively, the MCU would be two 8×8 blocks of Y samples followed by one 8×8 block of Cr samples and one 8×8 block of Cb samples:

Y1, Y2, Cr, Cb

Figure 4:
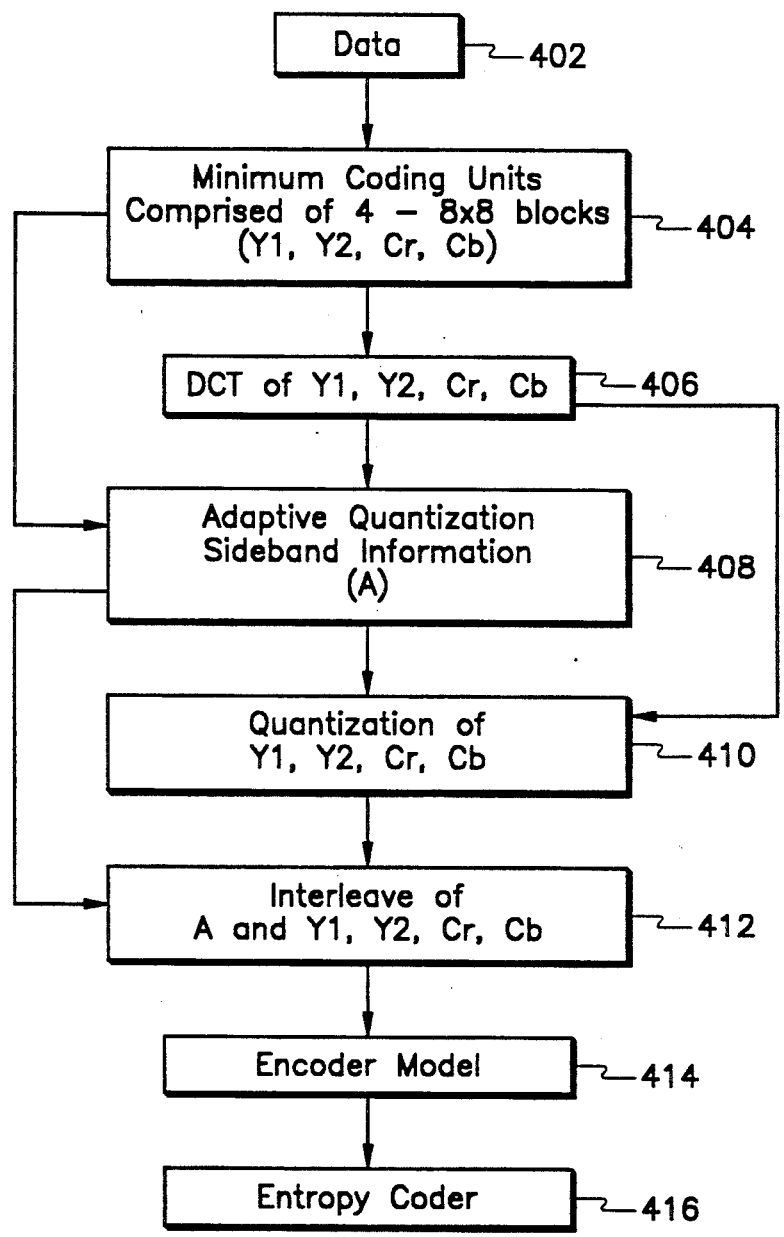
FIG. 4 shows a representative flow chart illustrating adaptive quantization according to the present invention.

The flow chart shown in FIG. 4 is an illustration of the adaptive quantization as a separate component for transmission together with the image components in a system which transmits multiple components of the image.

First, the Image data 402 is transformed into the MCU 404. The MCU is then transformed into the DCT representation, as shown at block 406. The adaptive quantization sideband information is the generated, as shown in block 408. This sideband information is used to help quantize the DCT components, as shown at block 410. The quantized DCT information (410) is then interleaved with the adaptive quantization sideband information (408), as shown at block 412.

The interleaved data is then fed into an entropy encoder model, shown at block 414, and then to an entropy coder, as shown at block 416 and discussed above in connection with the standard JPEG system.

Hence, the present invention achieves adaptive quantization by transmitting the additional component, which is a pseudo component labeled component "A". The component A (see block 406) contains sideband information relating to adaptive quantization. The interleave for the case would then be:

A, Y1, Y2, Cr, Cb (Seeblock 408.) The signaling of quantization changes is thereby accomplished upon decoding, as will become evident to artisans, in view of the above discussion of the JPEG standard. Given the basic structure of the interleave, the relationship between the information in component A and the quantization to be used for the MCU can be defined.

The following is one way of signaling changes in quantization. Other variations are clearly possible and are within the scope of this disclosure, as will became clear to artisans.

The variable "S" is defined as a scaling factor for the entire quantization table. The representation $S[x,y]$ is then defined as the scaling factor for $Q[x,y]$, where $Q[x,y]$ is a value in the table signaled by the JPEG Defined Quantization Table segment. The indices x and y are in the range 0 to 7. Normal conventions are used for ordering of r coefficients. Therefore, $S[0,0]$ is the scaling factor for the DC quantization value, for example.

When coding component A, the difference coded for the DC coefficient can be defined to give the change in S. Therefore:

$$S = S + d(DC)$$

The lossless one-dimensional predictive differential coding scheme used in coding DC coefficients is well suited to coding a scaling factor which only occasionally changes. An image segment that changes infrequently is more detectable to the human eye. Therefore, image compression of such segments is more susceptible to visual detection. (An arithmetic coding version will perform especially well if changes are infrequent.)

Similarly, the value coded for each AC coefficient AC[x,y] (relating to the so called high frequency image data) of component A can be defined to give the change in S[x,y], the scaling factor for Q[x,y]. Therefore:

$$S[x,y] = S[x,y] + AC[x,y]$$

Just as in the JPEG model for coding AC coefficients, the End-of-Block (EOB) code (Huffman coding) or EOB decision (arithmetic coding) terminates the coding of individual scaling factors. Therefore, if the EOB is coded immediately following the difference, no individual scaling factors are modified. (Again, if only simple general scaling of all coefficients is used, the arithmetic coding version will perform especially well.)

$$Q[x,y]' = \frac{(Q[x,y] * S[x,y] * S)}{256}$$

In this example, the normalization is defined such that the starting value assigned to S and to all S[x,y] values is 16. Note that S[0,0] is always 16 and cannot be modified. Note also that Q[x,y]' is an integer, and must be clamped to 1 if the calculation above would give 0.

The scaling equation as defined permits scaling of all quantization values, including the DC value. If, by convention, the DC is not scaled, the scaling equation would then apply only to the 63 AC coefficients.

By convention, if all tables are scaled identically, only one block is coded for component A in each MCU. However, if the quantization tables used in the scan need to be scaled individually, the sampling factor for component A is set such that one block of component A is coded for each scan component. The blocks of A are applied to the scaling of the quantization for each component in the order defined for the MCU. The interleave for this case would be:

A1, A2, A3, Y1, Y2, Cr, Cb

Where A1 would apply to Y1 and Y2, A2 would apply to Cr and A3 would apply to Cb.

The structures defined for the JPEG input data also allow the pseudo component information on adaptive quantization to be coded in a separate scan. The adaptive quantization conventions defined above in accordance with the present invention can also be used for this case.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. It will be understood by those skilled in the art that various changes in form and detail may be made therein without departing from the spirit and scope of the invention.

Having thus described our invention, what we claim as new and desire to secure by Letters Patent is:

1. A method for masking adaptive quantization during compressed image data transmission in a system for transmitting blocks of data representing multiple components of an image, comprising the steps of:
   generating a quantization table for each of the multiple image components;
   defining a common scaling factor for a portion of said quantization tables of the multiple image components; and
   signaling changes in quantization for successive blocks of the image data by transmitting said common scaling factor as a further component together with the image components to thereby signal adaptive quantization of the image data.

2. A method according to claim 1, further comprising the steps of:
   defining a separate scaling factor for each value in a portion of said quantization tables of the multiple image components; and
   transmitting said separate scaling factors as said further component together with the image components to thereby signal adaptive quantization of the image data.

3. A method according to claim 1, wherein said defining is done by coding changes in scaling such that said common scaling factor is the DC coefficients in a further image component.

4. A method according to claim 2, wherein said defining is done by coding changes in each separate scaling factor such that said differences in scaling factors are the corresponding AC coefficients in a further image component.

5. A method according to claim 2, wherein said defining is done by coding in each separate scaling factor such that it is a corresponding AC coefficient in a further image component.

6. A method for masking adaptive quantization during compressed image data transmission in a system for transmitting blocks of data representing luminance-chrominance components of an image, comprising the steps of:
   generating a quantization table for each of the luminance-chrominance image components;
   defining a common scaling factor for a portion of said quantization tables of the luminance-chrominance image components; and
   signaling changes in quantization for successive blocks of the image data by transmitting said common scaling factor as a further component together with the luminance-chrominance components to thereby signal adaptive quantization of the image data.

7. A method according to claim 6, further comprising the steps of:
   defining a separate scaling factor for each value in portions of each of said quantization tables of the luminance-chrominance image components; and
   transmitting said separate scaling factors as said further component together with the luminance-chrominance components to thereby signal adaptive quantization of the image data.

8. A method according to claim 7, further comprising the steps of:
- defining a first scaling factor for a portion of a Y quantization table of the luminance-chrominance image components;
- defining a second scaling factor for a portion of a Cr quantization table of the luminance-chrominance image components;
- defining a third scaling factor for a portion of a Cb quantization table of the luminance-chrominance image components; and
- transmitting said first through third scaling factors as a further component together with the luminance-chrominance components to thereby signal adaptive quantization of the image data.

9. A method according to claim 8, wherein said defining is done by coding changes in scaling such that the common scaling factor is the DC coefficients in a further image component.

10. A system for masking adaptive quantization during compressed image data transmission of blocks of data representing multiple components of an image, comprising:
- first means for generating a quantization table for each of the multiple image components;
- second means for defining a common scaling factor for a portion of said quantization tables of the multiple image components, said common scaling factor signaling changes in quantization for successive blocks of the image data; and
- third means for transmitting said scaling factor as a further component together with the image components to thereby signal adaptive quantization of the image data.

11. A system according to claim 10, wherein:
- said second means defines a separate scaling factor for each value in portions of each of said quantization tables of the multiple image components; and
- said third means transmits said separate scaling factors as said further component together with the image components to thereby signal adaptive quantization of the image data.

12. A system according to claim 10, wherein said second means defines coding changes in each separate scaling factor such that said differences in scaling factors are the corresponding AC coefficients in a further image component.

13. A system according to claim 10, wherein said second means defines coding in each separate scaling factor such that it is a corresponding AC coefficient in a further image component.

14. A system according to claim 10, wherein:
- said scaling factors signal changes in quantization for successive blocks of luminance-chrominance image data.

15. A system according to claim 14, further comprising:
- fourth means for defining a first common scaling factor for a portion of a Y quantization table of the luminance-chrominance image components;
- fifth means for defining a second common scaling factor for a portion of a Cr quantization table of the luminance-chrominance image components; and
- sixth means for defining a third common scaling factor for a portion of a Cb quantization table of the luminance-chrominance image components;
- wherein said transmitting means transmits said first through third scaling factors as a further component together with the luminance-chrominance components to thereby signal adaptive quantization of the image data.

16. A system according to claim 15, wherein:
- said fourth through sixth means define a separate scaling factor for each value in portions of each of said quantization tables of the multiple image components; and
- said third means transmits said separate scaling factors as said further component together with the image components to thereby signal adaptive quantization of the image data.

17. A system according to claim 16, wherein said fourth through sixth means use coding changes in scaling such that said common scaling factor is the DC coefficients in a further image component.

* * * * *